R. M. ANDERSON.
FLUID VALVE, THERMOSTATICALLY CONTROLLED.
APPLICATION FILED DEC. 29, 1919.
1,413,212.
Patented Apr. 18, 1922.
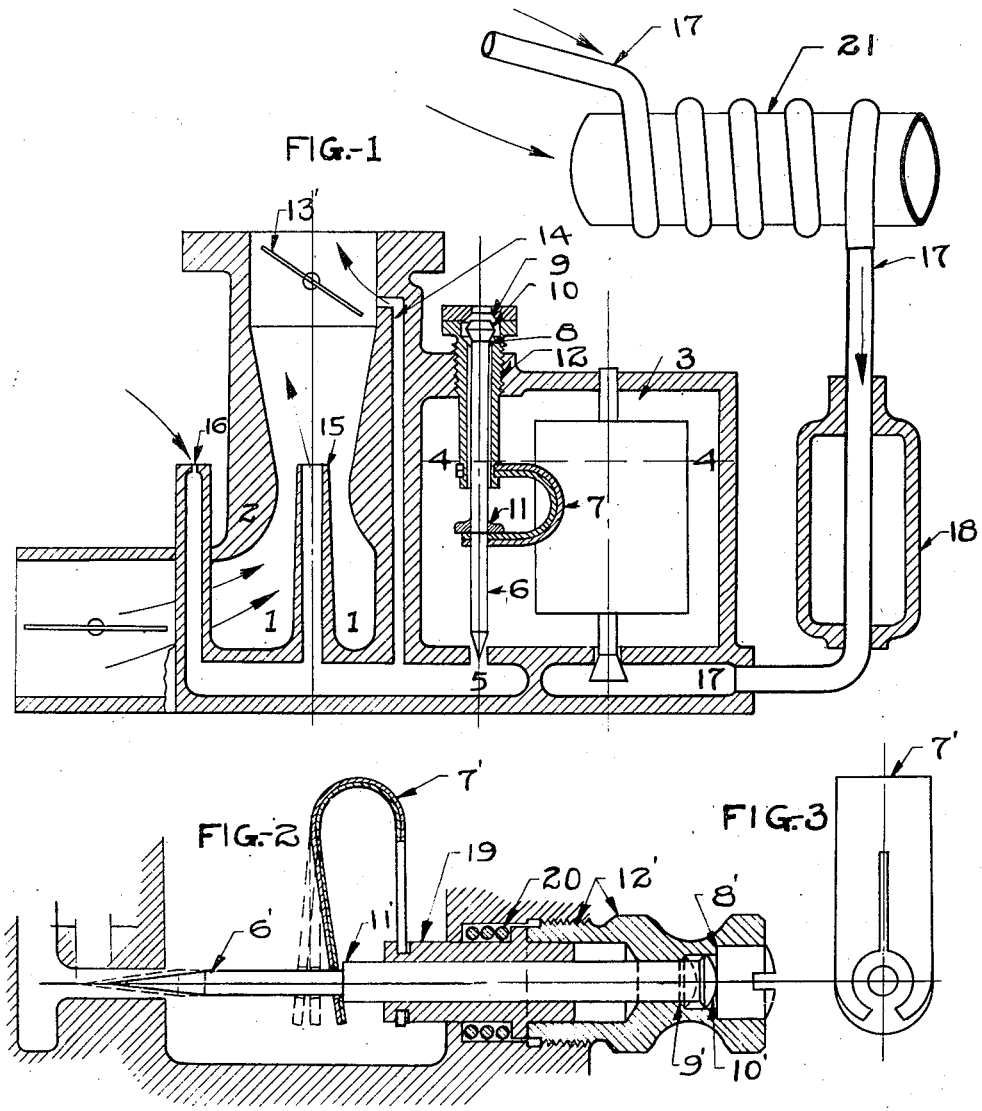

UNITED STATES PATENT OFFICE.

RAYMOND M. ANDERSON, OF DETROIT, MICHIGAN, ASSIGNOR TO GEORGE M. HOLLEY, OF DETROIT, MICHIGAN.

FLUID VALVE, THERMOSTATICALLY CONTROLLED.

1,413,212.

Specification of Letters Patent. Patented Apr. 18, 1922.

Application filed December 29, 1919. Serial No. 348,197.

*To all whom it may concern:*

Be it known that I, RAYMOND M. ANDERSON, citizen of the United States, residing at Detroit, in the county of Wayne and State of Michigan, have invented certain new and useful Improvements in Fluid Valves, Thermostatically Controlled, of which the following is a specification.

This invention relates to thermostatic means for controlling the flow of liquids. The said thermostatic means being especially adapted to regulate the fuel supply to an internal combustion engine, so that the fuel supply may be regulated to respond to the temperature changes of the liquid fuel.

This thermostat is also adapted for controlling the flow of fluids generally.

Figure 1 is a longitudinal vertical section of a carburetor to which my invention may be applied.

Figure 2 is a longitudinal section of the preferred form of the thermostat itself.

Figure 3 is a view of the thermoresponse element.

Figure 1 shows diagrammatically the application of this invention to a gasoline carbureter; 1 is the air inlet; 2 is the choke tube; 3 is the float chamber maintaining a constant level indicated by the line 4—4; 5 is the fuel orifice controlling the fuel supply from the float chamber to the fuel nozzle; 6 is the needle valve controlling this fuel supply. This needle valve is controlled in its turn by a thermostat 7, which is the subject of this invention, but is here only shown diagrammatically. This thermostat is carried by the adjustable piece 12. This thermostat 7 is submerged in the fuel of the float chamber. This needle 6 has at its upper end a head 10. This head 10 is located within the hollow head of a piece 12 threaded into the roof of the float chamber 3.

Surfaces 8 and 9 provide stops for limiting the movement of the needle 6, up and down. A shoulder 11 is also provided on the needle 6, and the thermostat 7 is arranged to contact with this shoulder 11 so that as the temperature of the fuel from the float chamber 3 rises, the needle drops and contacts with the shoulder 8. In a similar manner, when the temperature in the float chamber falls, the thermostat 7 contracts and raises the needle 6 by means of the shoulder 11 and causes the shoulder 10 on the upper portion of the needle 6 to contact with the shoulder 9 on the piece 12.

The remaining parts of the carbureter, which are of the well known plain tube type, are indicated as follows: 13 is the carbureter mixture throttle; 14 is the fuel bypass around the throttle to provide low speed operation; 15 is the main fuel nozzle discharging into the throat of the Venturi tube; 16 is the air vented auxiliary reservoir, which acts as the compensating means in a well known manner. A fuel supply pipe 17 is shown, which is jacketed at 18 with the lubricating oil supply of the engine. This pipe 17 also passes around a section of the exhaust pipe 21. The heat of the exhaust pipe is thereby transmitted to the fuel.

Figure 2 shows the needle, together with its thermostatic control and its manual adjustment, as actually constructed. In order to show this on a large scale it has been shown in a horizontal position, but actually it will operate only in a vertical or substantially vertical position, as will appear later.

In this drawing, 6' indicates the needle, 7' the thermostat which controls it, which is detachably mounted on the piece 19, the piece 7' being slotted as shown in Figure 3 so that it will snap into place over the piece 19, which is guided in the roof of the float chamber. The piece 19 rests on a spring 20 and is moved up and down by the piece 12' which is threaded into the roof of the float chamber, so that the adjustment of the piece 12' moves the piece 19 up and down and moves the thermostat element 7'. A shoulder 11' of the needle 6' rests on the thermostat 7' so that the contraction of the thermostat 7' raises the needle 6' and thereby admits more fuel through the opening from the float chamber to the fuel nozzle, as is described in the description of Figure 1.

The upper portion of the needle 6' is provided with a head 10', and the head of the adjustment 12', is provided with a shoulder 9' which limits the closure of the needle 6' as the needle 6' comes to rest and ceases to close further when the needle 6' falls, so that the head 10' seats on the shoulder 9'. In a similar manner, when the thermostat 7' contracts and thereby raises the needle 6' so that the head 10' strikes the plug 8', the needle valve ceases to open and therefore the travel of the needle is limited in both directions, up and down. It will be obvious from the above description that the needle is manually adjustable and that in any given adjustment the needle is responsive to temperature changes, within a limited range. It is further obvious that in the construction in Figure 2 that on the removal of the piece 12', together with the needle 6', the thermostat 7' is undisturbed, being supported by the piece 19. The great advantage of this construction is, therefore, that whenever a different set of conditions arise which require a greater or less response to the heating of the fuel, the taper of the needle can be changed without disturbing the thermostatic element 7'. It is thus possible to instantly change the effect of the thermostatic element 7' and thus satisfy the commercial requirements of such a device.

I claim as new:—

1. A needle valve; a stop preventing the complete closure of said valve; a stop limiting the opening of the said valve; a temperature responding element controlling the movement of said valve; manually adjustable means for moving simultaneously said valve and said temperature responding element; means for removing said valve and said manually adjustable means without disturbing the temperature responding element, for the purpose described.

2. A needle valve; a stop preventing the complete closure of said valve; a temperature responding element controlling the movement of said valve; manually adjustable means for moving simultaneously said valve and said temperature responding element; means for removing said valve and said manually adjustable means without disturbing the temperature responding element, for the purpose described.

In testimony whereof I affix my signature

RAYMOND M. ANDERSON.